United States Patent [19]
Jones

[11] Patent Number: 4,586,694
[45] Date of Patent: May 6, 1986

[54] COUPLING ASSEMBLY

[75] Inventor: Kendall Jones, North Hollywood, Calif.

[73] Assignee: TA Mfg., Inc., Glendale, Calif.

[21] Appl. No.: 510,688

[22] Filed: Jul. 5, 1983

[51] Int. Cl.$^4$ ............................................. F16K 51/00
[52] U.S. Cl. ................................................. 251/149.2
[58] Field of Search ..................... 251/149.2, 138, 212, 251/305; 137/512.1, 320

[56] References Cited

U.S. PATENT DOCUMENTS

| | | | |
|---|---|---|---|
| 2,824,755 | 2/1958 | Lamphear | 251/149.2 |
| 3,077,330 | 2/1963 | Lamphear | 251/149.2 X |
| 3,127,148 | 3/1964 | Collar | 251/149.2 |
| 3,561,725 | 2/1971 | Torres | 251/149.2 |
| 4,289,295 | 9/1981 | Allread | 251/149.2 |

Primary Examiner—Larry Jones
Attorney, Agent, or Firm—Charles H. Schwartz; Ellsworth R. Roston

[57] ABSTRACT

A coupling assembly for coupling high pressure air flow produced by ground equipment to a start nipple having an interior diameter of a particular dimension contained on an aircraft, including, a housing member having an enlarged section with an interior diameter of a dimension greater than the particular diameter of the start nipple and with the housing member having one end adapted for coupling to the ground equipment, a pair of vane members forming a clam shell type restrictor valve located within the enlarged section of the housing member and rotating around positions at the sides of the housing member and with the vane members in a closed position blocking the high pressure air flow through the coupling assembly and with the vane members in an open position forming a continuation of the interior diameter of the start nipple to form a continuous air flow path through the coupling assembly and start nipple, and a locking assembly coupled to the other end of the housing member and adapted for coupling to and locking on the start nipple.

8 Claims, 7 Drawing Figures

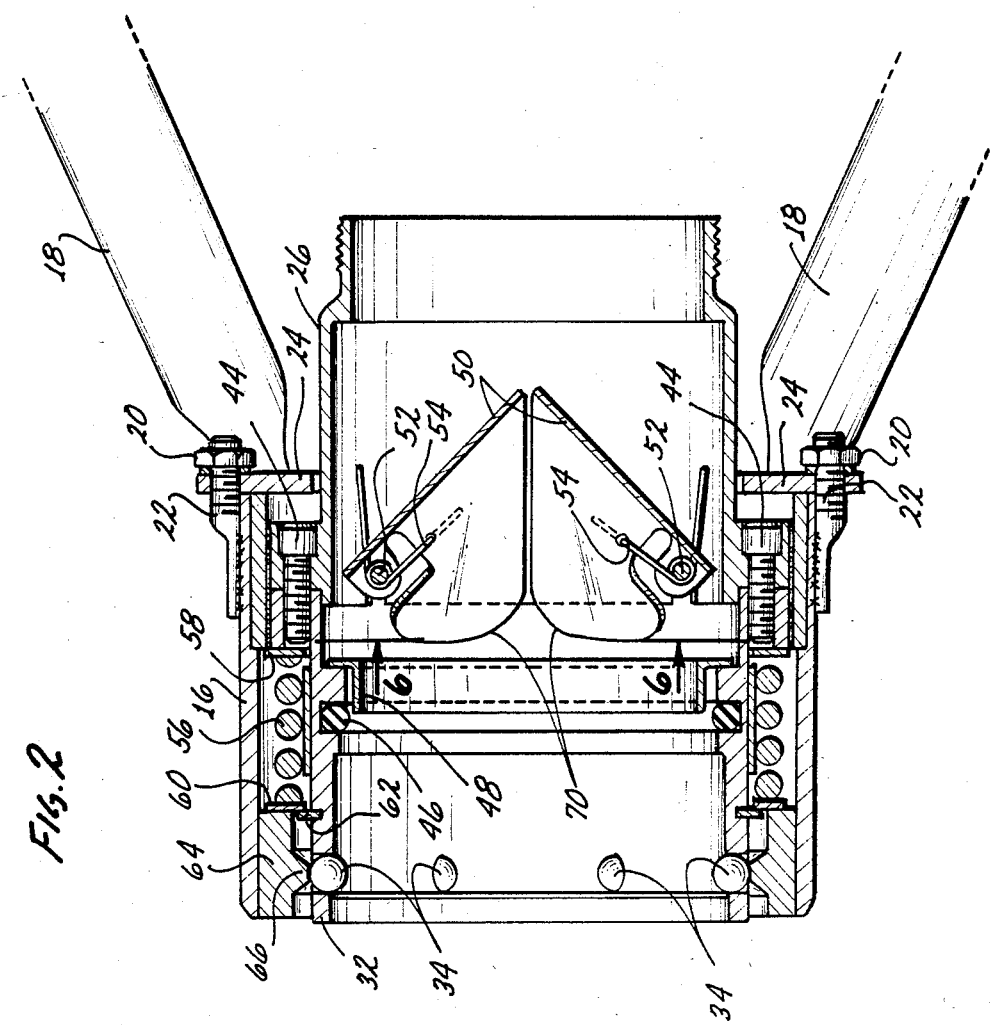

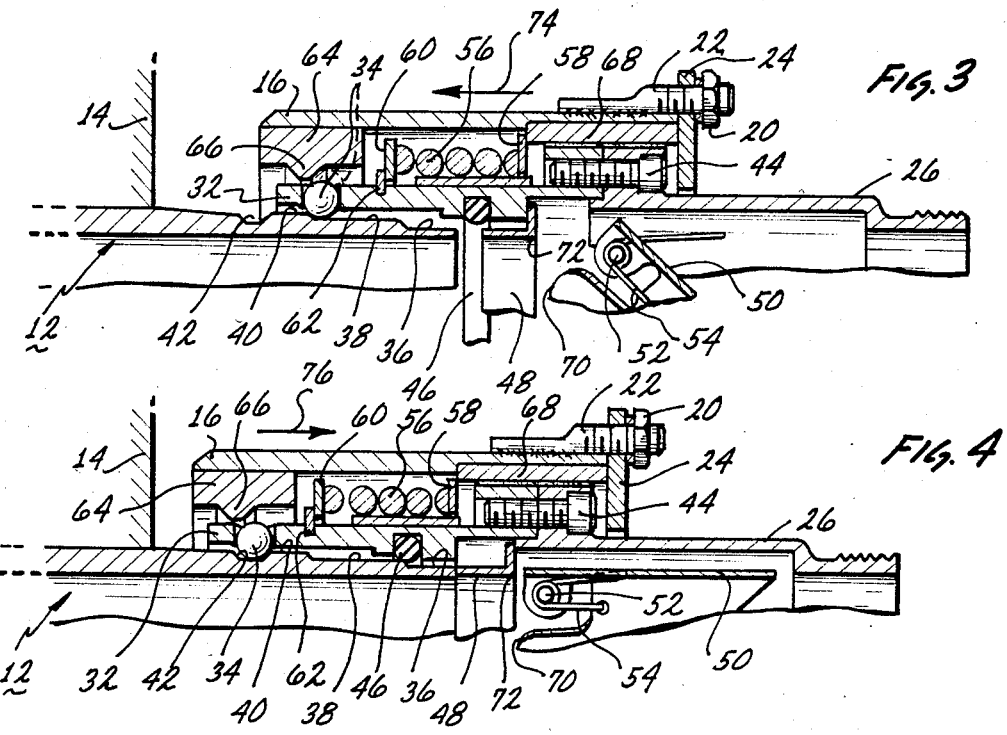
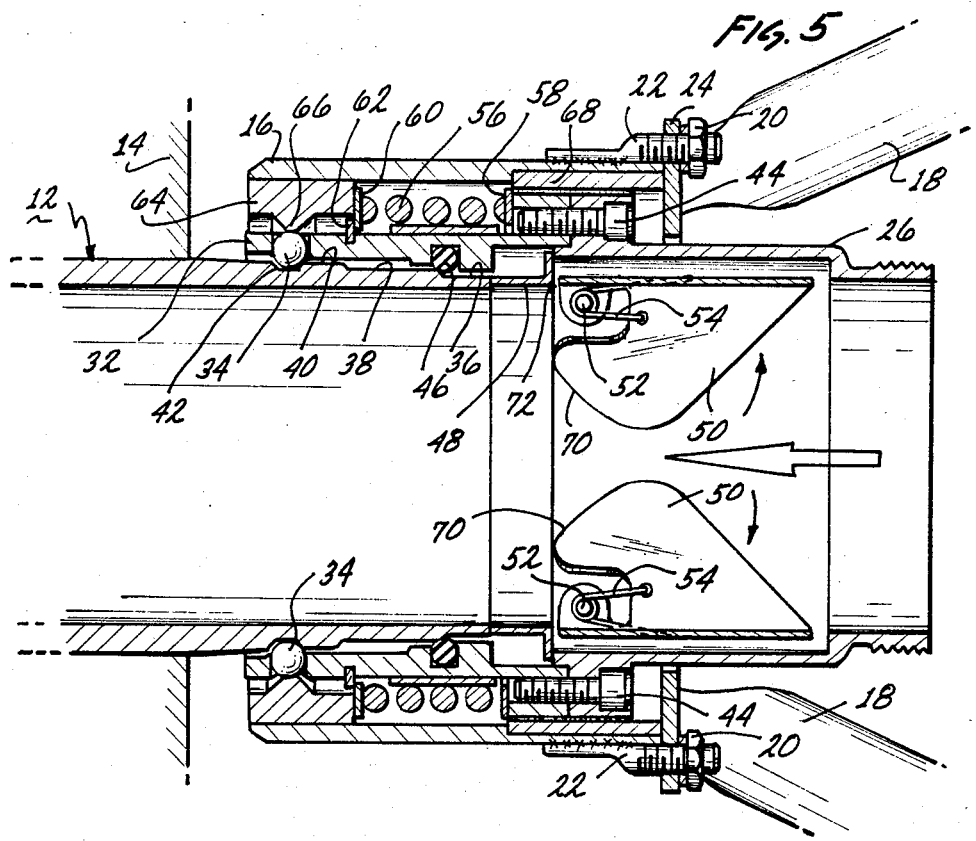

COUPLING ASSEMBLY

BACKGROUND OF THE INVENTION

1. Field of the Invention

The present invention relates to a coupling assembly and more specifically to a pneumatic coupling assembly for use in providing an air start for aircraft.

2. Description of the Prior Art

In the past, coupling assemblies have been used to couple ground equipment providing for a high pressure air flow to an aircraft for starting the aircraft engine. In general, these coupling assemblies operate with a push-pull operation wherein, the coupling assembly is pushed to engage an external coupling nipple on the aircraft, and it is pulled to release the coupling assembly. When the coupling assembly is engaged, this allows for the transferance of high pressure air from the ground equipment to the aircraft for use in starting the aircraft engine or in providing other functions while the aircraft is on the ground. The coupling assembly normally would include a valve so as to restrict the flow of any high pressure air when the coupling assembly is removed from the aircraft nipple. The valving therefore acts as a safety feature to prevent the coupling assembly and hose from causing damage or injury if the coupling assembly uncouples during use or if the coupling assembly is removed while the ground equipment is still providing high pressure air.

The prior art coupling assemblies generally included a butterfly valve, pivoted around a shaft located in the center of the passageway through the coupling assembly. The use of the butterfly valves positioned at a central position within the air flow path restricts the air flow even when the valves are in the open position and also allows for standing waves to be created in the air path. The location of the valves in the central position may restrict the flow of air up to twenty-five percent (25%) of the air flow if the passageway were unrestricted. In general, the prior art butterfly valves either consist of a single butterfly valve pivoted from the central position or a pair of butterfly valves each pivoted from the central position.

SUMMARY OF THE INVENTION

The present invention is directed to a coupling assembly which retains the familiar push-to-engage, pull-to-release action of the prior art devices yet includes fewer parts, provides greatly increased air flow and is more resistant to handling damage. Because of the advantages of the coupling assembly of the present invention, the repairable service life of the coupling assembly is increased and because of the use of fewer parts, overhaul is simpler and more economical.

The coupling assembly of the present invention incorporates an improved flow restriction valve which closes automatically on disengagement of the coupling assembly from the aircraft and with the improved flow restriction valve allowing for greater and smoother air flow of the high pressure air to the aircraft. In particular, the flow path for the high pressure air is completely opened up by the use of a clam shell type of restrictor valve formed by vanes which rotate to the sides of the air path and with the vanes positioned within an enlarged section in the air path. This design provides for a continuation in the flow path with no restrictions in the flow of air and with the substantial elimination of any standing waves which would tend to reduce the air flow.

The vane members are designed to provide for a linear movement as the coupling assembly is pushed to engage. This linear movement is advantageous in that it provides for a smooth movement of the vane members with no quick jerky motions which could cause damage to the vane members during opening and closing. In a preferred embodiment of the coupling assembly of the present invention, the vane member actually are designed to provide for equal angular or rotation movement of each vane member for each incremental linear movement of the actuator. The actual actuating surfaces which provide for the movement of the vane members are formed by a cam surface on each member and an actuating surface on an actuator ring. The actuating surfaces rotate or walk relative to each other as opposed to prior art actuators which slide relative to each other. Because the actuating surfaces rotate relative to each other, any lubricant used is not scraped off so that the service life between overhauls is greatly increased over prior art sliding actuators.

BRIEF DESCRIPTION OF THE DRAWINGS

A clearer understanding of the present invention will be had with reference to the following description and drawings wherein;

FIG. 2 is a cross sectional view of the coupling assembly located adjacent to the aircraft coupling nipple;

FIG. 3 is a fragmentary cross sectional view showing the coupling assembly initially engaging the coupling nipple on the aircraft;

FIG. 4 is a fragmentary cross sectional view illustrating the coupling assembly just prior to full locking on the coupling nipple located on the aircraft;

FIG. 5 illustrates a cross sectional view of the coupling assembly fully seated on the coupling nipple on the aircraft and with the vane members positioned out of the path of the air flow;

In FIG. 1 a coupling assembly 10, constructed in accordance with the teachings of the present invention, is shown adjacent an external nipple 12 positioned to extend from an aircraft 14. The nipple 12 is of a standard size and is generally referred to as a start nipple and is found on most turbo-jet powered aircraft. The coupling assembly 10 is designed to mate with the start nipple 12 and is of the type generally referred to as a push-to-engage and pull-to-release coupling.

Figure 1:
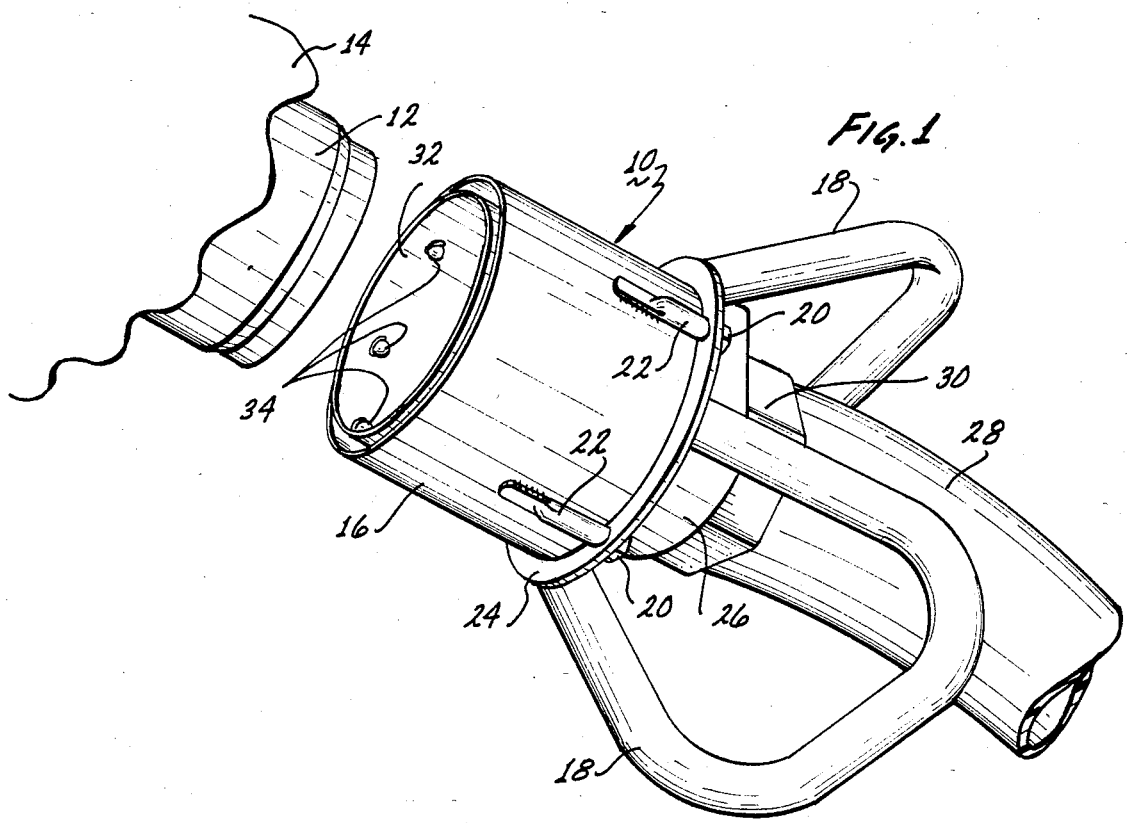
FIG. 1 is a perspective view of the coupling assembly of the present invention connected to a hose member and located adjacent to the coupling nipple on the aircraft.

The coupling assembly includes an outer slidable collar 16 which encloses the locking portion of the coupling assembly 10. A pair of handles 18 extend from a ring 24 and with the ring connected to the collar 16 through the use of nuts 20 which lock on to bolts 22 welded to the collar 16. The bolts 22 pass through openings in the ring 24.

A housing 26 extends back from the collar 16 and with the housing 26 containing and supporting the valve assembly. In addition, a flexible air hose 28 is coupled at the end of the housing 26 through the use of a locking member 30 as shown in FIG. 1.

Figure 6:
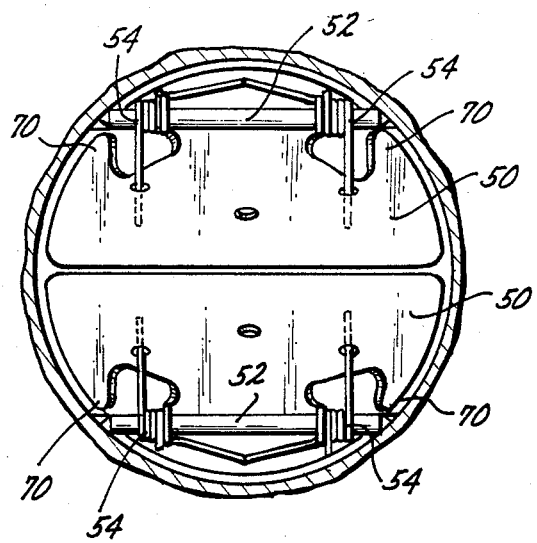
FIG. 6 illustrates a front view taking along lines 6—6 of FIG. 2 illustrating the vane members in the closed position.
Figure 7:
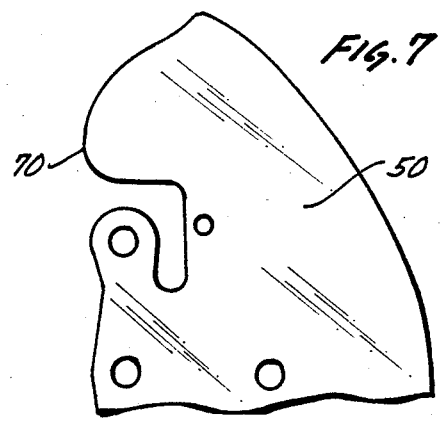
FIG. 7 is an enlarged flattened view of a portion of one of the vane members.

At the open end of the coupling assembly 10 and located within the collar 12, a coupling member 32 is designed to engage the start nipple 12. The coupling member 32 receives and supports a plurality of locking balls 34. FIGS. 2 through 5 illustrate the interior of the coupling assembly in more detail and FIGS. 6 and 7 illustrate details of the vanes located within the housing 26.

The start nipple 12 can be seen to include a plurality of steps including a lead in step 36, a first shelf portion 38, a second shelf portion 40 and a locking groove 42. Intermediate to all of these portions are tapered sections so that each step portion has a tapered transition to the next step portion.

The coupling member 32 and the housing member 26 are interconnected by the use of a plurality of screw members 44. In particular, the coupling member 32 and the housing member 26 each include outwardly extending interlocking flange portions 27 and 33 and the screw members 44 is positioned through the flange portions. The coupling member 32, in addition to supporting the locking balls 34, also includes recesses to support an O-ring 46 and a valve actuating ring 48.

The housing member 26 supports the valve assembly including two (2) vane members 50 mounted on shafts 52 and with the vanes 50 spring loaded by torsion springs 54 to the position shown in FIG. 2.

Intermediate the outer collar 16 and the coupling member 32 is located a collar spring assembly including a helical collar spring 56 which is positioned between washers 58 and 60. A locking washer 62 is located within a groove in the coupling member 32 and acts as a stop for the washer 60. In addition, the collar 16 includes an attached flange portion 64 having a step 66 with tapered sides to cooperate with the locking balls 34 for locking and unlocking. The collar 16 also includes a bearing member 68 to allow for slidable movement between the collar 16 and the coupling member 32.

FIG. 2 illustrates the coupling assembly prior to engagement with the start nipple 12. FIG. 3 illustrates the initial insertion of the coupling assembly 10 on to the start nipple 12, and wherein the outer collar 16 has been slid relative to the inner coupling member 32 and housing 26 so as to allow for the locking ball 34 to move along one side of the step 66. FIG. 4 illustrates the coupling assembly 10 fully seated on the start nipple 12 but just before the collar 16 returns to its locked position. FIG. 5 illustrates the coupling assembly fully seated on the start nipple 12 and with the locking balls 34 located within the groove 42 and locked in position.

At the same time that the coupling assembly 10 is fully seated on the start nipple 12, the vane members 50 are rotated outwardly to open the passageway through the coupling assembly and the start nipple for the passage of high pressure air flow. The engagement of the coupling assembly with the start nipple therefore automatically opens the vane members 50 which form the two (2) halves of a clam shell type restrictor valve. When the vanes 50 are in the open position as shown in FIG. 5, this provides a full diameter unrestricted flow area through the coupling assembly. The full diameter flow path is provided since the housing 26 has an enlarged portion 67 which has a larger internal diameter than the internal diameter of the start nipple 12.

The vane members 50 when rotated outwardly fit within the enlarged portion 67 of the housing 26 and provide an interior surface having a diameter approximately the same as the internal diameter of the start nipple 12. This can be seen in FIGS. 4 and 5 wherein a substantially unrestricted and continuous flow area is formed from the source of high pressure air through the hose 28, shown in FIG. 1, and in turn through the coupling assembly 10 to the start nipple 12. The use of the enlarged portion in the housing member 26 thereby provides for a substantial continuation of the flow path and since there is no internal restriction to the flow path, this reduces the possibly of any standing waves being formed in the flow path.

The actuation of the vane members 50 is accomplished through the use of the valve actuating ring 48. In particular, the valve actuating ring 48 is engaged by the end portion 36 of the start nipple 12. The ring 48 is pushed to engage against actuating surfaces 70 formed at the inner ends of the vanes 50. The actuating surfaces 70 of the vanes 50 cooperate with the flat end surface 72 of the valve actuating ring 48 to produce a smooth rotational movement of the vanes 50 in accordance with the linear movement of the valve actuating ring 48. In particular, the profiles of the rounded actuating surfaces cooperate so that there is an equal angular or rotational movement of the vane 50 with each incremental movement of actuating ring 48.

The surfaces 70 and 72 do not slide relative to each other but rather rotate relative to each other so that any lubricant between these surfaces is not scraped off as would occur with a sliding motion. This provides for a greater service life than the coupling assemblies of the prior art. In addition, because of the equal angular or rotational movement with each incremental linear movement, this produces a very smooth motion for the vanes 50 as they are opened and closed. In the prior art, the valve members could have quick rapid movements when actuated, which quick movements could cause damage to the valve assembly when opening and closing.

The actuating surface of the vane 50 can be seen in greater detail in FIG. 7 which illustrates a portion of the vane member 50 in the flat prior to the vane member being bent into a round configuration to fit within the interior of the housing 26. It can be seen that the surface 70 has a specific configuration so that the equal angular or rotational movement is produced in accordance with the linear movement of the actuating ring 48.

The locking of the coupling assembly 10 on to the start nipple 12 is accomplished as shown in FIGS. 3, 4 and 5. In particular, the coupling assembly is slid over the start nipple 12 until the locking balls 34 meet the sloping portion intermediate the sections 38 and 40 of the start nipple 12. The coupling assembly is pushed in the direction shown by the arrow 74 with sufficient force so that the collar 16 is moved in the direction shown by the arrow. This tends to compress the helical spring 56 since the bearing member 68 engages the washer 58 which in turn provides for compression of the spring 56. At the same time, the movement of the collar 16 allows for the locking balls 34 to move along one sloping side of the step portion 66, as shown by the dotted lines in FIG. 3, to allow the coupling assembly to continue to move to the position shown in FIG. 4. At this point, the locking balls 34 can engage the groove 42 and the collar 16 is now free to move back in the direction shown by the arrow 76 because of the force provided by the helical spring 56. The coupling assembly is now fully seated on the start nipple 12, and the various members are in the position shown in FIG. 5 with the locking balls fully seated and locked in position in the groove 42, and with the two (2) vanes 50 of the clam shell type restrictor valve fully open and giving unrestricted flow through the coupling assembly.

When it is desired to remove the coupling assembly, the coupling assembly is disengaged by pulling straight back on the handles 18. When the handles are pulled straight back, the flange portion 64 engages the washer 60 to again compress the spring 56 and also to allow the locking balls 34 to move along the other sloping side of the step portion 66 so that the coupling assembly may be pulled straight off the start nipple 12. When the coupling is disengaged, the vanes 50 close automatically as a safety feature to prevent any dangerous whipping of the hose 28 and the coupling 10 if air pressure was still present in the hose 28. It should be appreciated that the air pressure should normally be disconnected prior to disengagement of the coupling assembly but the automatic closing of the valve does provide for a safety feature.

The present invention therefore provides for an improved coupling assembly for coupling a piece of ground equipment, such as a source of pressurized air, to an aircraft for starting the aircraft engine. The present invention provides an unrestricted air flow without standing waves through the use of a clam shell type restrictor valve having two (2) vanes which open up in an enlarged section so as to provide for a continuation of the flow path. In addition, the vanes are opened and closed smoothly with no quick movements which could damage the vanes during opening and closing. The locking and unlocking of the coupling assembly on the start nipple is provided automatically through the use of a push-to-engage, pull-to-release action and with this accomplished with a minimum of parts and with a greater resistant to handling damage the prior art devices.

Although the present invention has been described with reference to a particular embodiment, it is to be appreciated that various adaptations and modifications may be made and the invention is only to be limited by the appended claims.

I claim:

1. A coupling assembly for coupling high pressure air flow produced by ground equipment to a start nipple having an interior diameter of a particular dimension contained on an aircraft, including,
   a housing member having an enlarged section with an interior diameter of a dimension greater than the particular diameter of the start nipple and with the housing member having one end adapted for coupling to the ground equipment,
   an actuating ring located adjacent the other end of the housing,
   a pair of vane members forming a clam shell type restrictor valve located within the enlarged section of the housing member and rotating around pivot positions at the sides of the housing member and with the van members in a closed position blocking the high pressure air flow through the coupling assembly and with the vane members in an open position forming a continuation of the interior diameter of the start nipple to form a continuous air flow path through the coupling assembly and start nipple and with each vane member having a shape to include actuating surfaces for receiving actuation force from the actuating ring and with the shape of each vane member providing the actuating surfaces located in front of and a substantial distance from the pivot positions, and
   said actuating ring positioned intermediate the vane members and the start nipple when the coupling assembly is coupled to the start nipple and with the end of the start nipple engaging the actuating ring to move the actuating ring into engagement with the actuating surfaces of the vane members to open the vane members, and
   a locking assembly coupled to the other end of the housing member and adapted for coupling to and locking on the start nipple.

2. The coupling assembly of claim 1 wherein the vane members are normally spring loaded to the closed position so that the vane members will return to the closed position upon the disengagement of the coupling assembly from the start nipple.

3. The coupling assembly of claim 1 wherein the actuating surfaces of the vane member have a rounded cam configuration in combination with the actuating ring to provide for equal angular movement of the vane members upon each incremental movement of the actuating ring.

4. The coupling assembly of claim 1 wherein the start nipple includes a circumferentially spaced groove and wherein the locking assembly includes,
   a coupling member including a number of circumferentially spaced openings for receiving and supporting individual locking balls and with the coupling member connected to the other end of the housing member and with the coupling member having an interior dimension to receive the start nipple to have the locking balls positioned within the exterior circumferential locking groove on the start nipple, and
   a spring loaded sliding collar coupled to and surrounding the coupling member and with the collar sliding relative to the coupling member between locking and unlocking positions and with the collar normally in the locking position for maintaining the locking balls in the locking groove and with the collar moved to the unlocking position to allow the entry or exit of the locking balls with the locking groove upon the application of sliding force to the collar.

5. A coupling assembly for coupling high pressure air flow provided by ground equipment to a start nipple having an exterior circumferential locking groove contained on an aircraft, including,
   a housing member having one end adapted for coupling to the ground equipment,
   an actuating ring located adjacent the other end of the housing,
   a pair of vane members located for rotation within the housing member around pivot positions and with the vane members in a closed position blocking the high pressure air flow through the coupling assembly and with the vane members in an open position forming a continuous air flow path through the coupling assembly and start nipple and each vane member having a shape to include actuating surfaces for receiving actuating force from the actuating ring and with the shape of each vane member providing the actuating surfaces located in front of and a substantial distance from the pivot position,
   said actuating ring positioned intermediate the vane members and the start nipple when the coupling assembly is coupled to the start nipple and with the end of the start nipple engaging the actuating ring to move the actuating ring into engagement with the actuating surfaces of the vane members to open the vane members, and a locking assembly coupled to the other end of the housing member and including, a coupling member including a number of circumferentially spaced openings for receiving and supporting individual locking balls and with the coupling member connected to the other end of the housing member and within the coupling member having an interior dimension to receive the start nipple to have the locking balls positioned within the exterior circumferential locking groove on the start nipple, and a spring loaded sliding collar coupled to and surrounding the coupling member and with the collar sliding relative to the coupling member between the locking and unlocking positions and with the collar normally in the locking position for maintaining the locking balls in the locking groove and with the collar moved to the unlocking position to allow the entry or exit of the locking balls with the locking groove upon the application of sliding force to the collar.

6. The coupling assembly of claim 5 wherein the start nipple has an interior diameter of a particular diameter and wherein the housing member includes an enlarged section with an interior diameter of a dimension greater than the particular diameter of the start nipple and with the pair of vane members forming a clam shell type restrictor valve located within the enlarged section of the housing member and rotating around positions at the sides of the housing member.

7. The coupling assembly of claim 6 wherein the vane members are normally spring loaded to the closed position so that the vane members will return to the closed position upon the disengagement of the coupling assembly from the start nipple.

8. The coupling assembly of claim 6 wherein the actuating surfaces of the vane member have a rounded cam configuration in combination with the actuating ring to provide for equal angular movement of the vane members upon each incremental movement of the actuating ring.

* * * * *